United States Patent [19]
Boisserand

[11] 3,809,413
[45] May 7, 1974

[54] DEVICE FOR THE CONNECTION OF CYLINDRICAL MEMBERS

[76] Inventor: Raymond Boisserand, Le Placyre, 38 Voiron, France

[22] Filed: Mar. 16, 1972

[21] Appl. No.: 235,285

[30] Foreign Application Priority Data
Mar. 19, 1971  France .............................. 71.09650

[52] U.S. Cl. ................................ 285/348, 285/356
[51] Int. Cl. ........................................... F16l 17/00
[58] Field of Search ............ 285/347, 356, 348, 321

[56] References Cited
UNITED STATES PATENTS

| 2,226,826 | 12/1940 | Miller | 285/321 X |
|---|---|---|---|
| 318,356 | 5/1885 | Cogan | 285/348 X |
| 2,105,022 | 1/1938 | Wilson et al. | 285/356 X |
| 2,282,738 | 5/1942 | Moore | 285/348 X |
| 2,543,185 | 2/1951 | Mathieu | 285/348 X |

FOREIGN PATENTS OR APPLICATIONS

| 511,530 | 6/1952 | Belgium | 285/356 |
|---|---|---|---|
| 357,800 | 1/1922 | Germany | 285/356 |
| 678,141 | 12/1929 | France | 285/356 |
| 67,460 | 10/1957 | France | 285/356 |

*Primary Examiner*—Dave W. Arola

[57] ABSTRACT

The specification discloses a connecting device comprising an elastic deformable ring and a barrel nut adapted to connect a tubular cylindrical member to a second cylindrical member, the tightening of the barrel nut causing the compression of the ring mounted on a receiving throat of the second member and extending into a blind bore formed on the inner surface of the tubular member, the barrel nut being in free slidable and rotatable relationship with the second member.

7 Claims, 8 Drawing Figures

PATENTED MAY 7 1974 3,809,413

DEVICE FOR THE CONNECTION OF CYLINDRICAL MEMBERS

The present invention concerns a device for connecting cylindrical members particularly tubular members of plastics material, making it possible to connect hermetically and stow one within the other a male cylindrical member and a female tubular member.

Systems in use at present for the hermetic connection of tubes frequently comprise a threaded collar, which is mounted loosely on the end of one of the members to be connected and is screwed directly on the end of the member or on a threaded sleeve carried thereby. A rubber or leather washer placed within the collar ensures, when the collar is screwed, the tight seal of the connection. This system of connection by which the two members are assembled end to end by means of the sealing washer, does not actually ensure the rigid stowing thereof. Apart from the fact that this sealing washer is not readily accessible and is in danger at any moment of becoming removed from the collar and being lost during the handling of members when not assembled, this arrangement has the disadvantage of requiring assembling on the spot of a collar at the end of one of the members, and, if the other member does not have a threaded end, it requires the presence at this end of an attached threaded sleeve. On the other hand, the locking of the collar can be obtained only by clamping with the aid of a wrench or similar tool and in many cases it is uncertain to such an extent that it is frequently necessary to use tow with which the threaded portion is previously provided. Finally, the sealing washer, kept squeezed between the two members hardens cracks thus having to be replaced periodically.

The device of the present invention surmounts the above described disadvantages. Being simply designed and operated it ensures a rigid and hermetic stowage of two cylindrical members by one partially penetrating the other.

According to the invention there is provided a device for connecting a male cylindrical member with a female tubular cylindrical member, wherein the male cylindrical member has a receiving throat formed on the periphery thereof and the female member has a radial blind bore formed on the inner surface thereof, which device comprises in combination an elastic deformable ring, adapted to be mounted on the receiving throat and adapted to extend in use into the blind bore, and a barrel nut adapted to be freely, rotatably and slidably mounted on the male member, the barrel of the nut being provided with engaging means, suitable for engaging with engaging means provided on the inner surface of the female member, such that when the barrel of the nut is engaged with the female member the elastic deformable ring is compressed forming a tight connection between the male and the female members.

The invention further provides a connection between a male cylindrical member and a tubular female cylindrical member wherein a receiving throat is formed on the periphery of the male member, an elastic deformable ring is mounted thereon, said ring extending into a radial blind bore formed on the inner surface of the female member the ring being compressed by the insertion between the receiving throat and the female member and engagement with the female member of the barrel of a barrel nut mounted freely, rotatably and slidably on the male member.

The invention also provides a method of connecting cylindrical members by the use of the above device.

The present invention will be more clearly understood with reference to the following description and the attached drawings which refer to one preferred embodiment and to four variations thereof and are by way of example only.

Figure 1A:
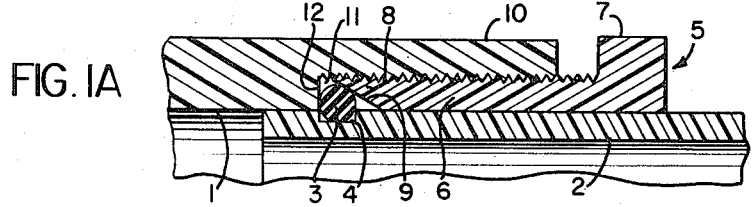
FIG. 1 is an upper axial semi-section through an embodiment of the connecting device of the present invention, shown before its operation and, in a lower semi-axial section, this same device after operation.
Figure 1B:
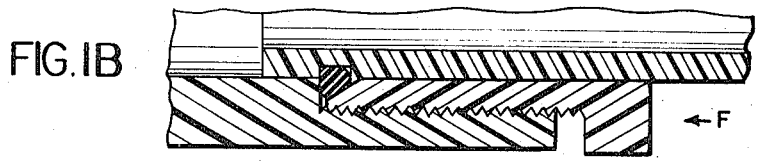
Figure 2A:
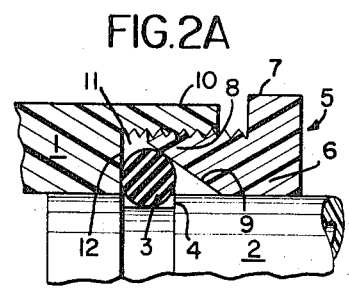
FIG. 2A shows on a magnified scale, a portion of the active part of the device shown in FIG. 1, before its operation.
Figure 2B:
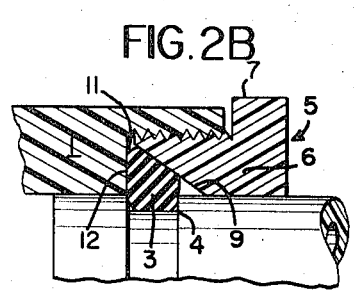
FIG. 2B shows on a magnified scale, the portion of the device shown in FIG. 2A after the operation of the device.

Referring first of all to FIGS. 1, 2A and 2B, the device of the present invention makes it possible to connect in a sealed manner two cylindrical members, the first 1 being tubular and the second 2 being either tubular as shown in the drawing, or solid, in the latter case representing a plug for the member 1. When this device is operated, the male member 2 partially penetrates the female member 1. The device consists of a ring 3 having a circular cross section, of deformable elastic material, which may for example, be rubber, the inner surface of which is applied to the bottom of the throat 4 formed in the circumference of the male member 2; and a nut 5 having a barrel 6 mounted to slide and rotate freely on the male member 2.

The cross section of the throat 4 shown at a right angle in the drawings may naturally have a different configuration, from that of the male member 2 for example it may be semi-circular, semi-elliptical, or semi-polygonal but must be such as to adapt itself accurately to the shape of the ring 3 which is slightly tensioned in the throat 4. The latter may be formed in the circumference of the female member 2 by any suitable means adapted to the nature of the material of which this member is made, preferably by moulding, turning, or constricting in the case of plastics material.

The nut 5 has an angular gripping portion 7, the diameter of which is preferably slightly greater than the outer diameter of the female member 1. The end 8 of the barrel 6 is bevelled inwardly and thus has a truncated surface 9 intended to progressively compress the ring 3 when the device is operated. Within the end 10 of the female member 1 a radial blind bore 11 is formed the base 12 of which serves for the longitudinal support of the ring 3. The barrel 6 co-operates with the female member 1 by screwing into the bore 11. For this purpose the barrel 6 has an outer thread and the bore 11 is threaded with the same pitch as the thread on the barrel 6. The faint longitudinal lines on the bore 11 and the barrel 6 represent these screw threads. It will be observed that this method of co-operation of the barrel 6 with the female member 1 may, if desired, be replaced by a bayonet connection or any other similar means.

The different members of the device with the exception of the ring 3 are preferably made of plastics material.

The operation of the device is as follows:

First of all, the male member 2 is provided with its barrel nut 5 which slides freely thereon. Then the elastic ring 3 is mounted on the throat 4 and the resultant unit is advanced into the female member 1 until the ring 3, extending radially in the blind bore 11, comes into longitudinal contact with the bottom 12 thereof, thus blocking the advance of the male member 2 in the female member 1. The connection of these two members is achieved by screwing the nut 5, the barrel 6 of which, progressing within the bore 11, locks the ring 3 in an annular space defined by the truncated surface 9 of the barrel and the dimensions of the ring being reduced at the same time as the advance of the barrel. The effect of this advance is to deform the ring 3 and to compress it simultaneously against the bottom 12 of the bore 11 and in the throat 4. Thus compressed, the ring 3 ensures the tight connection of the two members 1 and 2 whilst the barrel 6 of the nut 5 keeps these two members co-axial, radially blocking the bore 11.

The upper portion of FIG. 1 and FIG. 2A show the ring 3 before its compression and the lower part of FIG. 1, and FIG. 2B shows the same ring 3 compressed after the advance, in the direction of the arrow F (FIG. 1) of the barrel 6 by the screwing of the nut 5. Experience has shown that this screwing of the nut may be affected manually, without requiring the use of any special tool, with great efficiency. The extension of the nut 5 may naturally be improved by the formation of longitudinal fluting over the whole or a portion of its periphery.

Figure 3:
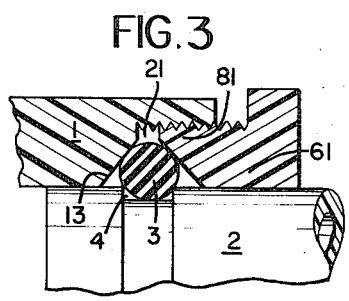
FIGS. 3, 4, 5 and 6 show respectively four possible variants of the portion of the device shown in FIG. 2A, before the operation of the device.

In a variant shown in FIG. 3, the bottom 13 of the bore 21 has a truncated bevelled configuration inverse to that of the end 81 of the barrel 61. This results in a symmetrical shape of the bearing recess for the ring 3, whatever its state of compression may be.

Figure 4:
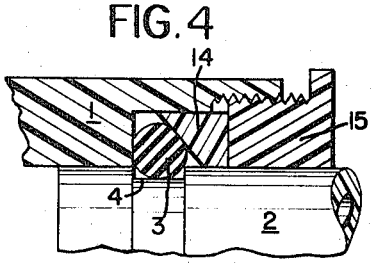

In the variant shown in FIG. 4, the end of the barrel 15 terminates in a plane annular surface perpendicular to the axis of the members 1 and 2 and does not act directly on the ring 3, but by means of a rigid clamping spacer collar 14, the cross section of which is a trapezoidal rectangle. During the rotation of the barrel 15 of the nut, this arrangement makes it possible to avoid any friction between the ring 3 and the collar 14.

Figure 5:
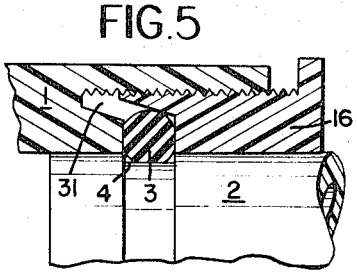
Figure 6:
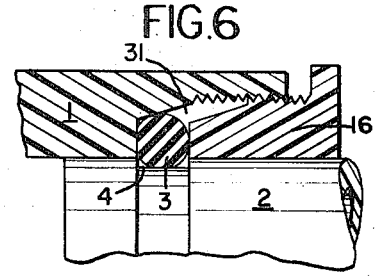

In the variant shown in FIGS. 5 and 6 the ring 3 is laterally locked between two plane annular surfaces perpendicular to the axis of the members 1 and 2, the first being the bottom of the bore 31, and the second the end of the barrel 16 of the nut. In these two embodiments, the periphery of the bottom of the bore 31 and that of the end of the barrel 16 have parallel truncated configurations, defining a cavity of adjustable longitudinal dimensions. In the embodiment shown in FIG. 5, the adjusting cone is carried by the end of the barrel, whilst in the embodiment shown in FIG. 6, this cone is carried by the bottom of the bore. These two symmetrical arrangements make it possible to increase the axial compression of the ring 3 by the feature of the greater latitude allowed for the advance of the barrel in the bore.

It will be noted that the device of the present invention prevents any flattening out of the ring during its compression and that it is not subjected to any chiselling action, so that its life is increased. Moreover, it is quite obvious that the members 1 and 2 may represent only the connecting ends of the longer members having different shapes and/or cross-sections.

When used for the connection of plastic tubing, the device offers a great number of advantages over and above those already mentioned, particularly in permitting the assembling of longitudinal tubes to be dismantled and reassembled without deterioration to its members which may then be reused, if not including any part of foreign matter, particularly metal, and not requiring the members to be connected to be located at an angle relatively to each other, thus facilitating the arrangement of the piping. It will be finally noted that the device has, once the members are connected, an unobtrusive appearance, making it possible to use it for visible connections, without compromising the aesthetic qualities of the environment.

The scope of application of the device of the present invention naturally extends to domestic or industrial cocks and valves having metal and/or plastic components.

Although only one embodiment of the present invention, with four variants thereof, has been described and illustrated, it is intended that any one skilled in the art may apply thereto any modifications of form or detail without departing from the scope of the present invention. It is possible, for example, to form the bore of the female member, not within, but externally thereof, said bore or recess then having an external thread and the barrel of the nut being bored or threaded internally and serving as a sleeve simultaneously for each of the two members.

I claim:

1. A joint-forming device for locking an externally smooth-surfaced cylindrical member into a female-threaded receptacle, comprising in combination: a cylindrically shaped male member having a cylindrical outer surface and an insertable end and having spaced from said end at a predetermined distance a circumscribing recess on the outer surface; a female member having a radially inwardly facing inner circumscribing female-threaded surface and defining at an axially located inner-end of the inner surface a radially inwardly extending circumscribing shoulder-wall; an O-ring elastic element having an outer diameter up to about that of the inner female-threaded surface and an inner-diameter as small as down to about that of said male outer surface; an externally male-threaded barrel nut means of external thread diameter of a size and shape to meshably engage said inner female-threaded surface, and having an inner bore-surface of an inner diameter at least as large as said male member's outer surface diameter, the improvement being said female member defining a through-passage bore having a bore diameter not less than the diameter of said outer surface, and said inner female-threaded surface and said shoulder wall at its most radially inward point each being of predetermined greater diameters than the diameter of said outer surface, and said barrel-nut means having an insertable-end and an opposite nut-end, and an outer barrel-surface defining radially between the outer barrel-surface and the inner-bore surface a predetermined thickness, with said insertable-end defining an inclined radially extending wall extending to a greater diameter at points nearer said outer barrel-surface in a direction away from said nut-end, whereby upon said barrel-nut means being screwed into said female member the barrel-nut means' inclined surface wall wedges said elastic element against said shoulder wall and radially inwardly against said male member within said recess thereby locking the male member against the possibility of being withdrawn from its inserted state.

2. A joint-forming device of claim 1, the improvement further comprising said female member including structure defining an axially extending circumscribing base-recess located between said shoulder-wall's outer extremities and the inner-end of the inner surface, and said inclined radially extending wall being shaped to be receivably insertable into said bore-recess whenever said barrel nut means is screwed into said female member.

3. A joint-forming device of claim 2, the improvement further including a wrench-engageable portion of said opposite nut-end being of greater diameter than an external diameter of said female member.

4. A joint-forming device of claim 3, the improvement further being said barrel nut means comprising separate nut-end and barrel-end portions in juxtaposition with one-another along a plane extending along their diameters respectively such that the nut-end portion is turnable in the tightening and loosening thereof respectively while the barrel-end portion is subject to remain stationary but in flush relationship with the remaining end of the barrel-end portion pressed against the elastic element.

5. A joint-forming device of claim 1, the improvement further including a wrench-engageable portion of said opposite nut-end being of greater diameter than an external diameter of said female member.

6. A joint-forming device of claim 1, the improvement further being said barrel nut means comprising separate nut-end and barrel-end portions in juxtaposition with one-another along a plane extending along their diameters respectively such that the nut-end portion is turnable in the tightening and loosening thereof respectively while the barrel-end portion is subject to remain stationary but in flush relationship with the remaining end of the barrel-end portion pressed against the elastic element.

7. A joint-forming device of claim 1, in which the improvement includes inner-barrel walls of the barrel-nut means and said outer surface being parallel to one-another.

* * * * *